United States Patent
Lu et al.

(10) Patent No.: US 8,856,521 B2
(45) Date of Patent: Oct. 7, 2014

(54) METHODS AND SYSTEMS FOR PERFORMING SECURE OPERATIONS ON AN ENCRYPTED FILE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 27 days.

(21) Appl. No.: 13/696,200

(22) PCT Filed: May 4, 2011

(86) PCT No.: PCT/CN2011/073667
§ 371 (c)(1),
(2), (4) Date: Nov. 5, 2012

(87) PCT Pub. No.: WO2011/137743
PCT Pub. Date: Nov. 10, 2011

(65) Prior Publication Data
US 2013/0080773 A1 Mar. 28, 2013

(30) Foreign Application Priority Data
May 7, 2010 (CN) .......................... 2010 1 0172056

(51) Int. Cl.
*G06F 21/00* (2013.01)
*G06F 21/60* (2013.01)
*G06F 21/62* (2013.01)
(52) U.S. Cl.
CPC .......... *G06F 21/602* (2013.01); *G06F 21/6218* (2013.01); *G06F 21/6209* (2013.01)
USPC ........................................... 713/165; 726/26

(58) Field of Classification Search
CPC .......................... G06F 21/6209; G06F 21/6218
USPC .......................................................... 713/165
See application file for complete search history.

(56) References Cited

U.S. PATENT DOCUMENTS

| 6,378,071 B1 * | 4/2002 | Sasaki et al. ................... 713/165 |
| 7,272,654 B1 | 9/2007 | Brendel |
| 7,526,720 B1 | 4/2009 | Kuwamoto et al. |

(Continued)

FOREIGN PATENT DOCUMENTS

| CN | 1373424 A | 10/2002 |
| CN | 1831701 A | 9/2006 |

(Continued)

OTHER PUBLICATIONS

International Search Report for PCT/CN2011/073667 dated Aug. 11, 2011.

*Primary Examiner* — Hadi Armouche
*Assistant Examiner* — Bryan Wright
(74) *Attorney, Agent, or Firm* — Fitch, Even, Tabin & Flannery, LLP (57) ABSTRACT

The invention discloses a file protecting method and a system therefor, relating to the information security field. The method includes: an application receives an instruction for opening a protected file sent by a user and invokes an upper interface of an operation system, and the upper interface sends an instruction for opening the protected file sent by a file system, and a filter driver intercepts the instruction for opening the protected file sent by the upper-layer interface to the file system, if the filter driver determines that the application is valid, it creates an image file on a virtual disk for the protected file, and returns a handler of the image file and reads or writes the protected file by the handler, which avoids a possible disclosure of plain text of the protected file in a buffer in prior art.

18 Claims, 3 Drawing Sheets

(56) References Cited

U.S. PATENT DOCUMENTS

| | | | |
|---|---|---|---|
| 2003/0093683 A1* | 5/2003 | Wong et al. | 713/189 |
| 2003/0226025 A1* | 12/2003 | Lin et al. | 713/193 |
| 2005/0091487 A1* | 4/2005 | Cross et al. | 713/165 |
| 2007/0050620 A1* | 3/2007 | Pham et al. | 713/165 |
| 2007/0255926 A1 | 11/2007 | Chuang et al. | |
| 2008/0133564 A1 | 6/2008 | Gandolph et al. | |
| 2009/0171971 A1 | 7/2009 | Goddard et al. | |
| 2010/0017625 A1* | 1/2010 | Johnson et al. | 713/190 |
| 2010/0185873 A1* | 7/2010 | Hashimoto et al. | 713/189 |

FOREIGN PATENT DOCUMENTS

| | | |
|---|---|---|
| CN | 101008794 A | 8/2007 |
| CN | 101063978 A | 10/2007 |
| CN | 101201883 A | 6/2008 |
| CN | 101853363 A | 10/2010 |

* cited by examiner

METHODS AND SYSTEMS FOR PERFORMING SECURE OPERATIONS ON AN ENCRYPTED FILE

FIELD OF THE INVENTION

The invention relates to the information security field, in particular to a file protecting method and a system therefor.

PRIOR ART

With development in computer technology, an information revolution takes place in all sections, especially in finance companies and software developing corporations where increase in sensitive data leads to a raise in electronic data to be protected, and security of the electrical data poses threats to survival of the enterprises, and therefore more focuses are put on file protecting.

In the meantime, more Trojan and the like viruses are emerging, and the wicked attackers plant more and more invalid programs into others computers for sensitive data stealing with more advanced technologies. In order to prevent the sensitive data from being stealed, more file protecting methods are provided. The easiest one is to hide the security file or add a password to it, but it is so volatile to be broken by scanning the computer or a violent crack, and thus a higher security method is also provided.

That is to encrypt a security file with a key being secretly kept, for example, in an encryption lock. The encryption lock is commonly a smart device with a USB interface and has functions of file protecting and priviledge managing together with a computer connected to it. Once the key is obtained by an attacker, it can protect the file. The method specifically includes installing a file protecting program in a computer, the file protecting program descrypts an encrypted file with a key to obtain plain text of the file for use by a valid operator while the encrypted file being opened by a valid program and forbids opening the encrypted file and refuses to descrypt the file in case of a try to open the encrypted file by an invalid program.

However, the above method is not absolutely safe. For example, in an operation system of a computer, when a valid program opens and descrypts a protected file, the operation system allocates a space for the descrypted plain text in its buffer, stores the pain text in the buffer, and returns a handler, and then the valid user is allowed to operate the protected file. When the valid user closes the protected file, the protected file in the buffer will not be cleared soon, at the time if an invalid program accesses the file by an upper interface, the plain text of the protected file will be read from the buffer.

In sum, the file protecting methods in prior art have a disadvantage that plain text of the protected file in a buffer can not be cleared soon after a valid application accesses the protected file. It results in that the plain text in the buffer is obtained by an invalid application through accessing the protected file before data in the buffer is cleared, and that the protected file is disclosed.

SUMMARY OF THE INVENTION

The main purpose of the invention is to provide a file protecting method and a system therefor to advoids the problem of access to the plain text by an invalid program with the buffer address in case that the plain text remains unclear in the buffer after an access to the protected file by a valid program. The solution is as below:

an application receives an instruction for operating a protected file sent by a user, the protected file is an encrypted file stored on a disk, the instruction for operating the protected file includes a instruction of opening, reading, writing and closing the protected file;

after receiving the instruction for opening the protected file, the operation of opening the protected file comprises:

the application invokes an upper interface of an operation system, and the upper interface sends an instruction for opening the protected file to a file system;

a filter driver intercepts the instruction for opening the protected file sent by the upper interface to the file system, and determines whether the application is valid application;

if yes, the filter driver reads attributes of the protected file and sends an instruction for creating an image file for the protected file in a virtual disk to the file system, and the file system creates the image file in the virtual disk with a virtual disk driver, and the operation system returns a handler of the image file to the application, and a reference count increases by one span;

wherein, creating the image file on the virtual disk comprises method A and B:

A, the filter driver reads attributes of the protected file through the file system, creates the image file, names the image file randomly, and writes into attributes of the protected file on the virtual disk, and data of the image file is empty;

Or,

B, the filter driver reads the protected file through the file system, decrypts it with a key stored in an encryption lock connected with a host, obtains plain text, stores the plain text on the virtual disk as data of the image file, names the image file randomly, as the image file;

after receiving the instruction for reading the protected file, the reading the protected file comprises:

the application sends an instruction for reading the protected file based on the handler;

if creating the image file on the virtual disk using method A, while data of the image file is empty, the filter driver intercepts the instruction for reading the protected file based on the handler sent by the application, reads a predetermined part or complete of the protected file from the disk, decrypts the predetermined part or complete with a key stored in an encryption lock connected with a host and obtains plain text of the predetermined part or complete of the protected file; and the operation system allocates a buffer for the image file, stores the predetermined part or complete of the plain text in the buffer allocated to the image file by the operation system and creates a file image between the protected file and its image file, the application completes the read operation on the protected file;

if creating the image file on the virtual disk using method B, while data in the image file is a plain text of the protected file, the filter driver intercepts the instruction for reading the protected file based on the handler sent by the application, reads the image file from the virtual disk through the virtual disk driver, and the operation system allocates a buffer for the image file, stores the plain text on the virtual disk in the buffer allocated to the image file by the operation system, the application completes the read operation on the protected file;

after receiving an instruction for writing the protected file, the operation of writing the protected file comprises:

the application sends an instruction for writing the protected file based on the handler, the application completes the writing operation of the protected file in plain text in the buffer allocated to the image file by the operation system, the writing operation includes inserting new data to, modifying, substituting or editing the protected file; the filter driver encrypts and stores the modified protected file;

after receiving an instruction for closing the protected file, the operation of closing the protected file comprises:

the filter driver closes handlers of the opened image file one by one, decreases the reference count, checks the reference count after the decrease, and deletes the image file while the reference count is an initial value.

A file protecting system comprises a file protecting driver and an encryption lock;

the file protecting driver comprises an application means, an upper interface means, a filter driver means, a file system means and a virtual disk driver means;

the application means is used for invoking the upper interface means to open a protected file stored on a disk, and for sending an instruction for reading and writing the protected file based on a handler with the upper interface means;

the upper interface means is used for receiving an instruction for operating the file sent by the application means, and for opening, reading, writing and closing the file by operation on the file system means;

the filter driver means is used for monitoring operation on the file system means in a host, and while a predetermined operation on the file system means, for implementing and monitoring the predetermined operation on the file system means;

the file system means is used for managing files stored on a disk, which can complete operation of creating file, indexing file, reading file or modifying the files;

the virtual disk driver means is used for, while receiving an instruction for creating an image file for the protected file sent through the file system means by the filter driver means, and for creating the image file;

and after creating the image file, the operation system returns a handler of the image file to the application means;

the encryption lock comprises a verification means and a key storing means;

the verification means is used for helping verify whether there is an encryption lock is connected to a host, if there is, the application means can starts, if no, the application means does not start;

and the key storing means is used for providing a decryption key while the filter driver means decrypts the protected file.

The solution provided by embodiments of the invention adds an image file to the file protecting system and stores a plain text of the protected file in the buffer allocated to the image file which is stored on a virtual disk. Because both the virtual disk and the image file are invisible to an invalid program, the invalid program may not obtain plain text of the protected file from the buffer by accessing the image file. So the solution advoids access to the plain text by an invalid program with the buffer address in case that the plain text remains unclear in the buffer after an access to the protected file by a valid program, and therefore is safer.

PREFERRED EMBODIMENTS OF THE INVENTION

For making purpose, solution and advantage clear, a detailed description will be given to the embodiments of the invention in combination with the drawings of it.

Embodiment 1

The embodiment provides a file protecting method, particularly dedicated to a read operaion on a protected file Encrypt.txt stored on a disk. Encrypt.txt is a protected file encrypted and stored on a user's disk.

When the user reads or modifies file Encrypt.txt, descryption of it is a necessary step for obtaining the plain text of it at the user interface.

A pertained application is selected for opening a file in some format in a special operation system. For example in Windows XP, when reading or writing a txt file, it is necessary to initiate notepad.exe provided by Windows XP, and to set up a process notepad.exe for invoking interfaces NtcreateFile, NtReadFile and etc, for opening, creating, reading or writing a file. In brief, starting notepad.exe is a precondition for opening Encrypt.txt.

Before the file protecting method provided in the embodiment, a further step is included of pre-processing the valid application provided by the operation system according to the file need to be protected. For the protected file Encrypt.txt, the step is preprocessing the application notepad.exe due to the txt format, which refers to shielding notepad.exe. The shielding notepad.exe is adding codes to notepad.exe, and therefore the operation system checks whether the host is connected to a valid encryption lock when running notepad.exe, if yes, it runs the process; if no, it does not load notepad.exe process.

Figure 1:
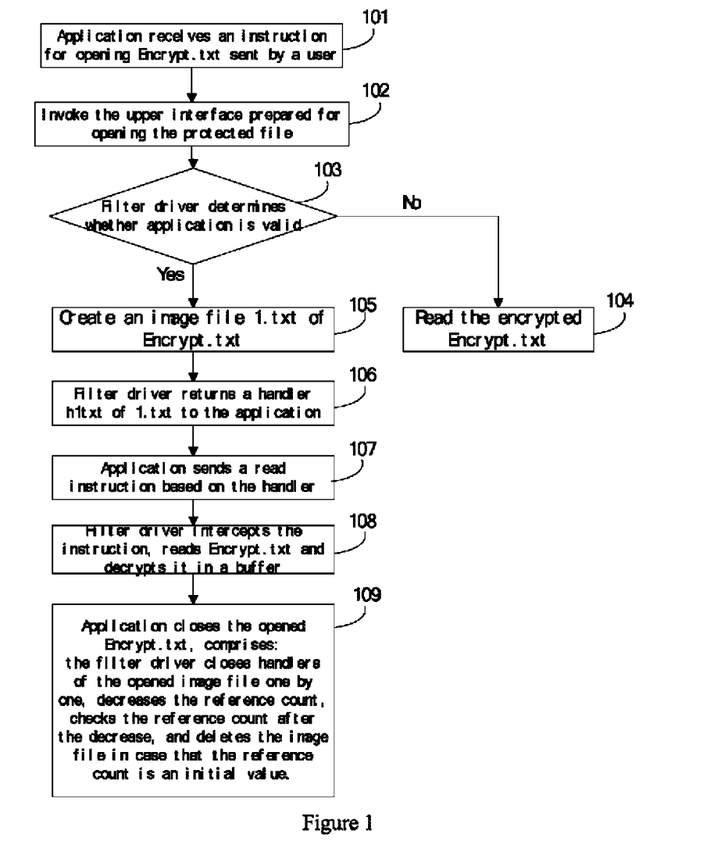
FIG. 1 is a flow chart of a file protecting method provided in embodiment 1 of the invention.

A file protecting method, as shown in FIG. 1, includes steps as follows.

Step 101, an application receives an instruction for opening a protected file Encrypt.txt sent by a user.

In the embodiment, it specifically is that the application, valid or invalid, receives the instruction for reading Encrypt.txt sent by the user.

The valid application is the shielded program notepad.exe, and a valid encryption lock having priviledge of running notepad.exe is coupled.

The invalid application is a program accessing the protected file Encrypt.txt without an authorization.

The embodiment further includes steps of, before step 101, starting an operation system, loading a filter driver and a virtual disk driver, and creating a virtual disk in the memory. The filter driver and virtual disk driver are dedicated for this invention, and the first one operates the virtual disk driver with the file system, such as creating, modifying and storing a file on the virtual disk. The virtual disk is created in a memory, which speeds up the reading and writing, and is only visible to the filter driver and programs authorized by it.

The virtual disk is an emulated disk section in the memory, on which a similar data storing format to a disk storage format is created, and therefore the section emulated as the virtual disk in the memory can be used as a common storage disk.

Step 102, the application invokes the upper application interface of the operation system, preparing for opening the protected file.

The upper application interface is an interface provided by the operating system for operating Encrypt.txt file, for example NtcreateFile and NtReadFile, which may be used to create and read .txt file.

Step 103, the filter driver intercepts the instruction sent by the upper application interface and determines whether the application is valid, if invalid, step 104 is executed; if valid, step 105 is executed.

The filter driver can be used to monitor operation on the file system in a host, and to implement a predetermined additional operation or a control of the predetermined operation on the file system while a predetermined operation on the file system, and to determine whether the application which sends out an instruction of opening the protected file is legitimate;

The predetermined operation on the file system includes reading/writing the predetermined file etc, such as reading the protected file Encrypt.txt.

The predetermined additional operation includes creating an image file, encrypting/descriptying a file, personalizing data and etc.

The filter driver determining whether the application is valid includes steps of requesting the shielded application to register the filter driver while shielding a valid application, recording the registration information of the valid application, and in case that there is an instruction for opening the protected file sent by the application through invoking a upper application interface, obtaining the application information, and determining whether it is concurrent with the registration information of the valid application, determining that it is valid in case of a positive result or invalid in case of a passive result.

The registration information includes a name, process ID, and path of the application, and registration table information of the application and etc.

Step 104, the operation system obtains the protected file Encrypt.txt from the disk, allocates a buffer space to it and reads it.

In the step, the buffered and read file Encrypt.txt is an encrypted file for lack of a key to descrypt it.

The step may also be returning an error and refusing an access to Encrypt.txt by an invalid application.

Step 105, the filter driver creates a new file as an image file of the protected file on visual disk and names it after 1.txt in the embodiment.

The filter driver creating an image file of the protected file includes:

Step A, the filter driver reads attributes of the protected file which includes size, type, creation date and etc of the file.

Contents of the protected file are stored in an encryption form, while attributes of it are in plain text form which is obtained by reading attributes of the protected file by the file system for the filter driver.

Step B, the filter driver sends an instruction for creating 1.txt in the virtual disk to the file system.

Step C, the file system sends an instruction for creating 1.txt to a virtual disk driver which creates 1.txt.

Step D, write data into the image file 1.txt in the virtual disk.

The writing data to the image file 1.txt applies either of the following two methods.

Method 1, write attributes of the protected file Encrypt.txt into the virtual disk and take them as attributes of the image file 1.txt which is an empty file.

Method 2, write attributes of the protected file Encrypt.txt into the virtual disk, take it as attributes of the image file 1.txt, and at the same time the filter driver reads data from Encrypt.txt, decrypts it with a key stored in an encryption lock connected with a host to obtain plain text, and write the plain text into the virtual disk as data in the image file 1.txt.

In the Method 2, while decrypting the Encrypt.txt, preferably, Encrypt.txt is decrypted in cluster, partly as predetermined or completely, to obtain a predetermined or complete plain text, and the plain text is stored on the virtual disk as data in 1.txt. The decrypting the protected file is not limited to a decryption in cluster, but to a decryption in stream, byte, block and etc.

When creating an image file for the protected file Encrypt.txt, the filter driver names it randomly, and the name is different from that of any other file stored on the disk, such as 1.txt.

Step 106, the filter driver returns a handler of the image file 1.txt to the application, which is h1txt in the embodiment.

It further includes steps of adding one span to the reference count, Preferably, adding 1 to the reference count, to the reference count used for recording number of handlers of the opened image file and setting the reference count to be initial value 0 in case that the filter driver does not return a handler of the image file or declining one span from the reference count while closing a handler of the image file.

Step 107, the application sends an instruction for read operation based on the handler h1txt.

Step 108, the filter driver intercepts the read instruction based on h1txt, reads the encrypted Encrypt.txt stored on the disk, decrypts it, and reads Encrypt.txt in plain text to the buffer allocated to 1.txt by the operation system.

The filter driver decrypting the encrypted Encrypt.txt further includes that the decryption key is stored in an encryption lock connected with a host and the protected file may be encrypted with symmetric cryptography or asymmetric cryptography. Reading Encrypt.txt in plain text in the buffer allocated to 1.txt by the operation system further includes that the filter driver creates an image between Encrypt.txt in the buffer and the encrypted Encrypt.txt stored on the disk, and decrypts Encrypt.txt stored on the disk and reads it in block in the buffer for saving the buffer space.

The decrypting the protected file and storing its plain text in the buffer allocated to the image file includes either of the two methods.

First method is decrypting complete of the protected file and storing it into the buffer allocated to the image file, which is appropriate to a small-sized protected file.

Second method is decrypting part of the protected file, to be accessed, in cluster and storing it into the buffer allocated to the image file, which is appropriate to a big-sized protected file, in premise that the protected file is encrypted in cluster. The above method is used when the first method is applied at step D of step 105.

When the second method is applied at the step, step 108 may include that:

the filter driver intercepts the read instruction based on the handler h1txt and sends an instruction for reading the image file to the file system, and the file system reads data of the image file 1.txt through the virtual disk driver and stores it in the buffer allocated to the image file by the operation system.

Step 109, the application closes the opened protected file Encrypt.txt.

In the embodiment, after step 109, the method further includes that: the filter driver closes handlers of the opened image file 1.txt one by one, declines the reference count, checks it after each decline and deletes the image file while a refrence count is initial value 0.

A file protecting method is disclosed in the embodiment installs a filter driver in a system, and therefore at the time of accessing a protected file, a valid application creates an image file of the protected file on the virtual disk, rather than opening a real protected file, changes name of it, allocates a buffer for it, decrypts and stores it in the buffer and opens the protected file with a handler of the image file. The virtual disk being only visible to a valid application and handler of the image file being only obtained by a valid application avoid that a wicked application intercepts the handler and reads the protected file in plain text from the buffer, which enhances protection of the file in the buffer. In sum, the method is safer.

Embodiment 2

The embodiment is implemented by writing a protected file Encrypt.txt stored on a disk, in which, the writing operation includes the operation of inserting new data to it, editing and modifying the protected file.

Same as the step in embodiment 1, the protected file Encrypt.txt is stored on a disk after being encrypted. For example, in a windows XP system, a valid application notepad.exe for opening Encrypt.txt is shielded by inserting codes to notepad.exe, and the inserting provides the application with function of determining whether a valid encryption lock is inserted while notepad.exe being started, if yes, running notepad.exe, permitting to create a notepad.exe process by the system and writing Encrypt.txt with notepad.exe; or if no, forbidding to run notepad.exe.

When being connected to a host, the encryption lock may authenticate the valid process notepad.exe. A key is stored in the encryption lock for encrypting or decrypting the protected file Encrypt.txt.

Figure 2:
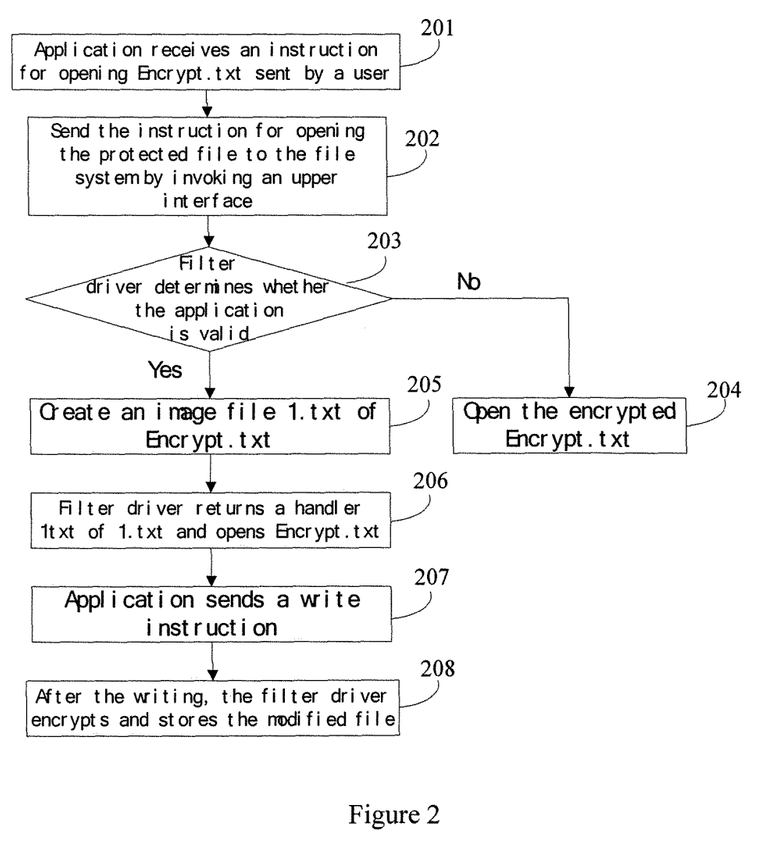
FIG. 2 is a flow chart of a file protecting method provided in embodiment 2 of the invention.
Figure 3:
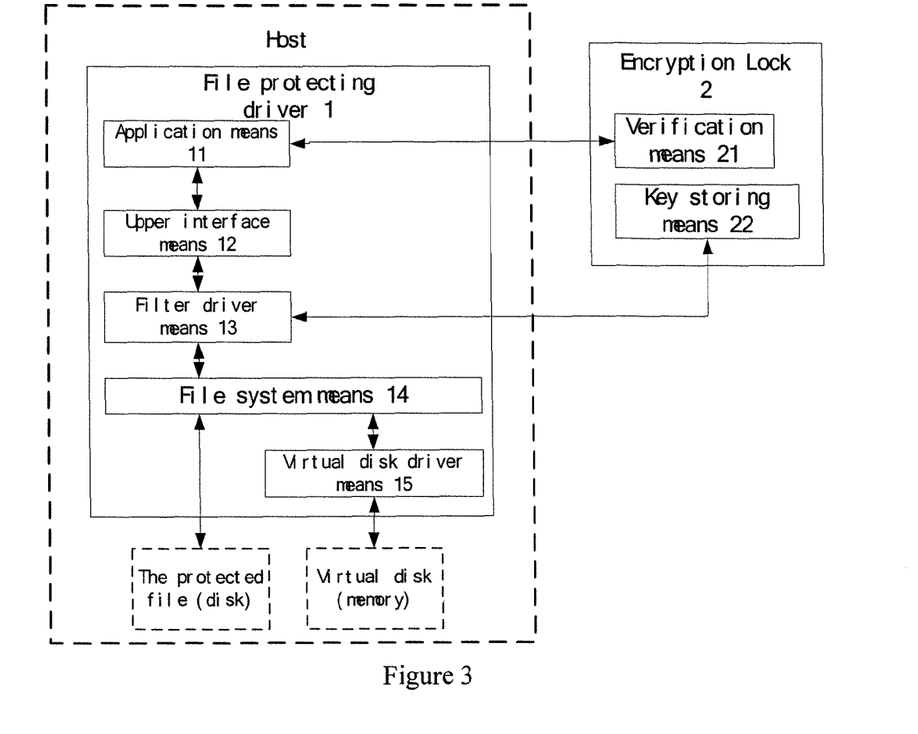
FIG. 3 is a structural frame of a file protecting system provided in embodiment 3 of the invention.

A file protecting method, as shown in FIG. 2, includes steps as follows.

Step 201, an application receives an instruction for opening a protected file Encrypt.txt sent by a user.

In the embodiment, the application includes valid application or invalid application, The valid application is a shielded notepad.exe. An association can be created between notepad.exe and txt format, and therefore if a user opens Encrypt.txt, notepad.exe starts and determines whether a valid encryption lock is connected, if yes, creats a notepad.exe process and operates Encrypt.txt with notepad.exe.

The invalid application is written by an attacker for thefting or modifying the protected file, which may be started without a connection of an encryption lock.

Same as embodiment 1, before step 201, the method further includes that the system starts, loads a filter driver and a virtual disk driver, and creates a virtual disk in the memory.

Step 202, the application invokes an upper application interface of an operation system to send an instruction for opening the protected file to the file system.

Both the valid and invalid application open the protected file with the upper interface provided by the operation system and the upper interface in Windows XP includes NtcreateFile and NtReadFile.

The file system includes FAT, NTFS and etc, by which the operation system manages files stored on the disk.

Step 203, the filter driver intercepts an instruction for opening the protected file Encrypt.txt sent to the file system by the upper interface of the operation system and determines whether the application is valid, if no, step 204 is executed; if yes, step 205 is executed.

The filter driver is used for monitoring an operation on the file system in the host system and executing a predetermined additional operation or controlling the operation on the predetermined file system while an operation on the predetermined file system, also used for determining whether the application sending the instruction for opening the protected file is valid.

Particularly, the filter driver suspends the instruction upon intercepting an instruction for opening the protected file Encrypt.txt sent by the upper interface of the operation system to the file system, and executes the instruction according to a result from dermination of the application.

The filter driver determining whether the application is valid includes that, while shielding a valid application, the filter driver requires a register from the shielded application, records registration information of the valid application, and while an instruction for accessing the protected file by the application through invoking the upper application interface in the operation system, it obtains the application information, and determines whether it is same with the registration information of the recorded valid application, if yes, the application is determined valid, if no, it is determined invalid.

The registration information includes name, process ID, path, registration information of the application and etc.

Step 204, the operation system opens an encrypted Encrypt.txt by its file system.

At step 203, if the filter driver determines that the application is an invalid application, it opens Encrypt.txt with the file system, loads data of Encrypt.txt stored on a disk in a buffer, and the system allocates it a buffer address and returns a handler. Encrypt.txt is displayed in plain text for lack of decryption of it.

After the step, the method further includes that the invalid application sends an instruction for writing Encrypt.txt with the upper interface of the operation system, and the upper interface sends a write instruction to the file system, and the filter driver intercepts the instruction, forbids it and returns an error of invalid modification.

Step 205, the filter driver creates a new file as an image file of the protected file, such as 1.txt with same steps as those at step 105 in embodiment 1, so more details are eliminated.

Step 206, the filter driver returns a handler h1txt of 1.txt to the valid application and opens the protected file.

The opening Encrypt.txt to obtain the plain text of it includes steps as follows.

Step 206*a*, the filter driver filter returns the handler h1txt of 1.txt;

Step 206*b*, the application sends an instruction for reading the file based on the handler h1txt;

Step 206*c*, the filter driver reads and decrypts Encrypt.txt, stores it in plain text in the buffer allocated to 1.txt by the operation system and creates a file image.

Step 206*c* may also include that the filter driver reads the image file 1.txt, in which Encrypt.txt in plain text is stored, from a virtual disk.

The filter driver decrypting the encrypted Encrypt.txt includes that the decryption key is stored in an encryption lock connected to the host, and a symmetric or non-symmetric algorithm is used for encrypting the protected file.

After returning the handler h1txt of 1.txt to the valid application, the filter driver may also add 1 to the reference count.

Step 207, the application sends an instruction for writing the protected file Encrypt.txt based on the handler and writes it.

The writing Encrypt.txt is implemented in the buffer, this means that what is modified is the data of Encrypt.txt stored in the buffer.

The writing includes writing, deleting, replacing, modifying, editing Encrypt.txt and etc.

Step 208, the writing completes, and the filter driver encrypts the plain text of Encrypt.txt in the buffer, stores it and obtains a modified Encrypt.txt.

Step 208 uses either of the following two methods.

First, at step 206*c*, the filter driver reads the full plain text of Encrypt.txt in the buffer for further being written by a user, and after the writing, overwrites Encrypt.txt stored on the disk with that stored on the buffer completely to obtain a modified Encrypt.txt.

Second, the filter driver encrypts or decrypts the protected file in cluster which is the smallest storage unit of the disk. At step 206c, the filter driver writes Encrypt.txt to be operated partly in a buffer, and after the writing, encrypts it in cluster, replaces the modified clusters in Encrypt.txt stored on the disk, and the operation system allocates new clusters for storing the added data, and records order of the clusters while a position change of data in the cluster in Encrypt.txt, to obtain a modified protected file Encrypt.txt.

In case that the step 206c is a step that the filter driver reads the image file 1.txt from the virtual disk, a third method is used that the application modifies Encrypt.txt in plain text in the buffer and Encrypt.txt on the virtual disk, and after the writing, it encrypts Encrypt.txt in plain text in cluster on the virtual disk and replaces the encrypted Encrypt.txt stored on the disk with it.

After step 208, the method further includes that the filter driver closes handlers of the opened image file 1.txt respectively, decreases the reference count, checks the reference count after each decrease and deletes the image file while a reference count 0.

The file protecting file is implemented by creating a virtual disk in a memory and an image file on the virtual disk, which avoids the disclosure of the protected file in the process of decrypting it in the buffer in prior art. Also, all read/write operations are dedicated to the image file and the virtual disk is only visible to a valid application, which greatly improves security of the file.

Embodiment 3

The embodiment provides a file protecting system, as shown in FIG. 2, the above file protecting system includes a file protecting driver 1 and an encryption lock 2.

The file protecting driver 1 includes an application means 11, an upper interface means 12, a filter driver means 13, a file system means 14 and a virtual disk driver means 15.

Specifically:

The application means 11 is used for invoking the upper interface means 12 to open a protected file stored on a disk and to send a read/write instruction based on a handler.

Further, the application means 11 includes:

a verification unit 111 for verifying whether a valid encryption lock is connected to a host at the time the application means 11 is started, if yes, the application means 11 is started; if no, the application means 11 is not started;

an open unit 112 for sending an instruction for opening the protected file to the upper interface means 12 upon receiving the instruction for opening the protected file sent by a user, and for accessing the protected file based on the handler upon receiving a handler of the image file;

and a read/write unit 113 for sending a read/write instruction based on the handler upon receiving the handler of the image file returned by the operation system.

The upper interface means 12 is used for receiving a file operating instruction sent by the application means 11, and for opening, reading, writing and closing the file by operating the file system means 14;

The filter driver means 13 is used for monitoring operation on the file system means 14 in the host, implementing and monitoring a predetermined additional operation on the file system means 14 upon checking it;

The predetermined additional operation is creating an image file, decrypting a file, personalizing data and etc;

Further, the filter driver means 13 includes a filter unit 131, a determination unit 132, a decryption unit 133 and an image file creating unit 134.

The filter unit 131 is used for monitoring whether the upper interface means 12 opens the protected file and after the opening, executing a predetermined additional operation;

The determination unit 132 is used for determining whether the application which opens the protected file is valid in case that the filter unit 131 intercepts a predetermined operation on the file system means 14, if yes, sending an instruction for creating an image file to the file system means 14; if no, opening the protected file without decryption. The predetermined operation on the file system refers to opening, reading or writing the protected file;

The decryption unit 133 is used for sending an instruction for reading the protected file to the file system means 14 upon receiving the instruction for reading or writing the file based on the handler sent by the upper interface means 12, decrypting the encrypted protected file to obtain plain text of the protected file and storing it in a buffer allocated to the image file by the operation system;

The image file creating unit 134 is used for sending an image file creating instruction to the file system means 14 and naming the image file randomly.

The file system means 14 is used for managing files stored on a disk, such as creating, indexing, reading or modifying the files on the disk;

The virtual disk driver means 15 is used for creating an image file on the virtual disk upon receiving the instruction for creating an image file of the protected file sent by the filter driver means 13 through the file system means 14. After the image file is created, the operation system returns a handler of it to the application means 11;

The encryption lock 2 includes a verification means 21 and a key storing means 22;

The verification means 21 is used for helping verify whether an encryption lock is connected to a host, if yes, the application means 11 is started; if no, the application means 11 is not started.

The key storing means 22 is used for providing an encryption/decryption key in case that the filter driver means 11 encrypts or decrypts the protected file.

The creating the image file on the virtual disk includes that:
the filter driver means 13 reads attributes of the protected file by the file system means 14, creates the image file on the virtual disk, and writes attributes of the protected file. Data of the image file is empty;

Or, the creating the image file on the virtual disk includes that the filter driver means 13 reads the protected file with the file system means 14, decrypts it with a key stored on the encryption lock 2 to obtain the plain text of it, and stores the plain text on the virtual disk as the image file;

If data of the image file is empty, after the application means 11 sends read instruction based on the handler, the method further includes that:

the filter driver means 13 intercepts the read instruction based on the handler sent by the application means 11, reads predetermined part or complete of the protected file from the disk and decrypts it with a key stored on the encryption lock 2 to obtain the predetermined part or complete of plain text of the protected file, and the operation system allocates a buffer to the image file, stores the predetermined part or complete of plain text of the protected file in the buffer and creates a file image.

After the application means 11 sends the read instruction based on the handler, the filter driver means intercepts the file reading instruction based on the handler sent by the application, sends the read instruction based on the handler to the file system means 14, reads the image file on the virtual disk with the virtual disk means, and the operation system allocates a buffer to the image file and stores the plain text being on the virtual disk in the buffer allocated to the image file by the operation system.

The filter driver means 13 decrypting the predetermined part or complete of the protected file with a key stored in the encryption lock 2 includes that the filter driver means 13 decrypts the predetermined part or complete of the protected file in cluster with a key stored in the encryption lock 2.

The filter driver means 13 further includes an encryption unit 135 for, at the time of storing the predetermined part of plain text of the protected file in a buffer allocated to the image file by the operation system, encrypting the plain text in cluster, being written by the application means 11, and modifying the protected file stored on the disk by the file system means 14.

Or, the encryption unit 135 is used for, at the time of storing complete plain text of the protected file in a buffer allocated to the image file by the operating system, encrypting the plain text in cluster, being written by the application means 11 and overwriting the protected file stored on the disk.

The filter driver means 13 further includes a reference count unit 136 for recording number of handlers of the image file. When the protected file is to be opened without returning handlers of the image file, value of the reference count unit 136 is set to be an initial value, increases by one span each time a handler of the image file is returned and decreases by one span each time a handler of the image file is closed. Once value of the reference count is declined to the initial value, the image file will be deleted.

The system provided in the embodiment is a counterpart of or compensation for embodiment 1 and 2, which embodies and derives from the methods.

All steps and orders thereof disclosed in embodiments of the invention are preferred ones and therefore they can be adjusted as required, and names of files can change as agreed, and all changes within the scope of the invention should be protected.

The above are only preferred embodiments of the invention, not a limit to the invention. Any change, substitution and modification within the principle of the invention will be protected by the invention.

What is claimed is:

1. A file protecting method, comprising:
   receiving, by an application, an instruction for operating a protected file sent by a user, the protected file being an encrypted file stored on a disk, the instruction for operating the protected file including an instruction of opening, reading, writing and closing the protected file;
   after the instruction for opening the protected file is received, the operation of opening the protected file comprises:
   invoking, by the application, an interface of an operating system, and sending, by the interface, an instruction for opening the protected file to a file system;
   intercepting, by a filter driver, the instruction for opening the protected file sent by the interface to the file system, and determining whether the application is valid;
   if yes, reading, by the filter driver, attributes of the protected file and sending an instruction for creating an image file for the protected file on a virtual disk to the file system, and creating, by the file system, the image file on the virtual disk with a virtual disk driver, and returning, by the operating system, a handler of the image file to the application, and increasing a reference count by one span;
   the creating the image file on the virtual disk comprises:
   reading, by the filter driver, attributes of the protected file through the file system, creating the image file, naming the image file randomly, and writing into attributes of the protected file, and data of the image file is empty;
   or reading, by the filter driver, the protected file through the file system, decrypting it with a key stored in an encryption lock connected with a host, obtaining plain text, storing the plain text on the virtual disk as data of the image file, naming the image file randomly, as the image file;
   after the instruction for reading the protected file is received, the operation of reading the protected file comprises:
   sending, by the application, an instruction for reading the protected file based on the handler;
   if data of the image file is empty, intercepting, by the filter driver, the instruction for reading the protected file based on the handler sent by the application, reading a predetermined part or all of the protected file from the disk, decrypting the predetermined part or all with a key stored in an encryption lock connected with a host and obtaining plain text of the predetermined part or all of the protected file; and allocating, by the operating system, a buffer for the image file, storing the predetermined part or all of the plain text in the buffer allocated to the image file by the operating system and creating a mapping between the protected file and its image file, and completing, by the application, the read operation on the protected file;
   if data in the image file is plain text of the protected file, intercepting, by the filter driver, the instruction for reading the protected file based on the handler sent by the application, reading the image file from the virtual disk through the virtual disk driver, and allocating, by the operating system, a buffer for the image file, storing the plain text on the virtual disk in the buffer allocated to the image file by the operating system, and completing, by the application, the read operation on the protected file;
   after an instruction for writing the protected file is received, the operation of writing the protected file comprises:
   sending, by the application, an instruction for writing the protected file based on the handler, completing, by the application, the operation of writing the protected file in the plain text in the buffer allocated to the image file by the operating system, the operation of writing including inserting new data to, modifying, substituting or editing the protected file;
   encrypting and storing, by the filter driver, the modified protected file;
   after an instruction for closing the protected file is received, the operation of closing the protected file comprises:
   closing, by the filter driver, handlers of the opened image file one by one, decreasing the reference count, checking the reference count after the decrease, and deleting the image file in case that the reference count is an initial value.

2. The method according to claim 1, wherein, before the application receives the instruction for opening the protected file sent by the user, the method further comprises:

starting the operating system, loading the filter driver automatically, loading the virtual disk driver, and creating the virtual disk in a memory.

3. The method according to claim 1, wherein, if the application is determined as invalid, the method further comprises:
obtaining, by the interface, the protected file through the file system, and allocating, by the operation system, a buffer for the protected file, and reading the protected file into the buffer, the protected file read in the buffer being in encryption form; or,
returning an error to the application, and forbidding the invalid application from accessing the protected file.

4. The method according to claim 1, wherein, the decrypting a predetermined part or all of the protected file with a key stored in an encryption lock connected with a host, comprises:
decrypting, by the filter driver, the predetermined part or all of the protected file in cluster as a unit with the key stored in the encryption lock connected with the host.

5. The method according to claim 4, wherein,
while storing the predetermined part of plain text in the buffer allocated to the image file by the operating system, the encrypting and storing, by the filter driver, the modified protected file, comprises: encrypting, by the filter driver, the plain text of the modified protected file in cluster as a unit with the key stored in the encryption lock connected with the host and modifying clusters of the protected file being stored on the disk with the file system; or,
while storing the complete plain text in the buffer allocated to the image file by the operating system, the encrypting and storing, by the filter driver, the modified protected file, comprises: encrypting, by the filter driver, the complete modified protected file with the key stored in the encryption lock connected with the host and overwriting the protected file stored on the disk.

6. The method according to claim 1, wherein the interface is provided by the operating system for being invoked by the application and provides the application with functionality to create, open and read a file.

7. The method according to claim 1, wherein the determining whether the application is valid comprises:
before the file is protected, registering the valid application to the filter driver, recording, by the filter driver, the registration information of the valid application, obtaining the information of the application in case that an application invokes the interface to send an instruction for accessing the protected file, and determining whether it is the same as the registration information of the valid application, if yes, determining the application is valid; if no, determining the application is invalid;
and the registration information comprises a name of the valid application, process ID, path and registration information of the valid application.

8. The method according to claim 1, wherein, before the application receives an instruction for opening the protected file sent by the user, the method further comprises:
shielding the application and determining whether there is a valid encryption lock connected thereto in case of being started, if yes, the application can be started; if no, the application cannot be started.

9. The method according to claim 1, wherein the reference count is used for recording the number of handlers of the image file, the reference count is an initial value if a handler of the image file is not returned, and the reference count increases by one span each time a handler of the image file is returned while decreasing by one span each time a handler of the image file is closed.

10. A file protecting system, wherein the system comprises a file protecting driver and an encryption lock;
the file protecting driver comprises an application, an interface of an operating system, a filter driver, a file system and a virtual disk driver;
the application configured to invoke the interface to open a protected file stored on a disk and to send an instruction for reading and writing the protected file based on a handler through the interface;
the interface configured to receive an instruction for operating the file sent by the application, and to open, read, write, and close the file by operation on the file system;
the filter driver configured to monitor operations on the file system in a host, and in case of a predetermined ,operation on the file system implement and monitor the predetermined operation on the file system;
the file system configured to manage files stored on a disk, which can complete the operations of creating, indexing, reading or modifying the files;
the virtual disk driver configured to create the image file in case of receiving an instruction for creating an image file for the protected file sent through the file system by the filter driver;
and after creating the image file, the operating system returns a handler of the image file to the application;
the encryption lock configured to help verify whether it is connected to a host, if yes, the application can start, if no, the application cannot start;
and the encryption lock comprising a key storage configured to provide a decryption key while the filter driver decrypts the protected file;
wherein the filter driver is configured to;
monitor whether there is an operation for the interface to open the protected file, and if there is an operation to open the protected file, to execute the predetermined additional operation;
determine whether the application for opening the protected file is valid in case a predetermined operation on the file system is intercepted and if valid, to send an instruction for creating an image file to the file system means, and if invalid, to open the protected file without decryption of the protected file;
send an instruction for reading the protected file to the file system upon receiving the instruction for reading or writing the image file based on the handler sent by the interface decrypt the encrypted protected file to obtain the protected file in plain text, and store in a buffer allocated to the image file by the operating system;
send an instruction for creating an image file to the file system and name the image file randomly.

11. The system according to claim 10 wherein the predetermined additional operation refers to an operation selected from a group consisting of creating the image file, encrypting or decrypting the file, and personalizing data.

12. The system according to claim 10, wherein the file system is configured to send an instruction for creating an image file to the virtual disk driver upon receiving the instruction for creating the image file from the filter driver.

13. A file protecting system, wherein the system comprises a file protecting driver and an encryption lock;
the file protection driver comprises an application, an interface of an operating system, a filter driver, a file system and a virtual disk driver;

the application configured to invoke the interface to open a protected file stored on a disk and to send an instruction for reading and writing the protected file based on a handler through the interface;

the interface configured to receive an instruction for operating the file sent by the application, and to open, read, write, and close the file by operation on the file system;

the filter driver configured to monitor operations on the file system in a host, and in case of a predetermined operation on the file system, to implement and monitor the predetermined operation on the file system;

the file system configured to manage files stored on a disk which can complete the operations of creating, indexing, reading or modifying the files;

the virtual disk driver configured to create the image file in case of receiving an instruction for creating an image file for the protected file sent through the file system by the filter driver;

and after creating the image file, the operating system returns a handler of the image file to the application;

the encryption lock configured to help verify whether it is connected to a host, if yes, the application can start, if no, the application cannot start;

and the encryption lock comprising a key storage configured to provide a decryption key while the filter driver decrypts the protected file;

wherein the filter driver reads attributes of the protected file by the file system, creates the image file, and writes into attributes of the protected file on the virtual disk, and data of the image file is empty; or, the filter driver reads the protected file by the file system, decrypts the protected file with a key stored in the encryption lock to obtain plain text and stores the plain text on the virtual disk as the image file.

14. The system according to claim 13, wherein, while data of the image file is empty, after the application sends the instruction for reading the file based on the handler, the system further comprises:

the filter driver intercepts the instruction for reading the file based on the handler sent by the application, reads a predetermined part or all of the protected file from the disk and decrypts the predetermined part or all of the protected file with a key stored in the encryption lock to obtain the predetermined part or complete plain text of the protected file, and the operating system allocates a buffer for the image file, stores the predetermined part or all of the plain text in the buffer allocated to the image file by the operating system and creates a file image.

15. The system according to claim 13, wherein, after the application sends the instruction for reading the file based on the handler, the system further comprises:

the filter driver intercepts the instruction for reading the file based on the handler sent by the application, sends it to the file system and reads the image file from the virtual disk by the virtual disk driver, and the operating system allocates a buffer for the image file and stores the plain text stored on the virtual disk in the buffer allocated to the image file by the operating system, and the reading the protected file is ended.

16. The system according to claim 14, wherein
the filter driver decrypts the predetermined part or all of the protected file in cluster with the key stored in the encryption lock.

17. The system according to claim 14, wherein the filter driver:

while storing the predetermined part of plain text in the buffer allocated to the image file by the operating system, encrypts the plain text of the protected file modified by the application in cluster and modifies the protected file stored on the disk with the file system; or while storing the complete plain text in the buffer allocated to the image file by the operating system, encrypts the plain text of the protected file modified by the application in cluster and overwrites the protected file stored on the disk.

18. The system according to claim 14, wherein the filter driver is further configured: to record the number of handlers of the image file, to set a reference count having an initial value when a handler of the image file is not returned, to increase by one span the reference count when a handler of the image file is returned, to decrease by one span the reference count when closing a handler of the image file, and to delete the image file in case the reference count is the initial value.

* * * * *